(12) United States Patent
Oruganti et al.

(10) Patent No.: US 12,259,788 B2
(45) Date of Patent: Mar. 25, 2025

(54) CONFIGURABLE ENTITY-BASED UNDO AND REDO OPERATIONS

(71) Applicant: Oracle International Corporation, Redwood Shores, CA (US)

(72) Inventors: Satish Chandra Oruganti, Bengaluru (IN); Ganesh Kumar Gupta, Bangalore (IN); Michael Patrick Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/653,558

(22) Filed: May 2, 2024

(65) Prior Publication Data

US 2024/0281336 A1     Aug. 22, 2024

Related U.S. Application Data

(63) Continuation of application No. 17/903,801, filed on Sep. 6, 2022, now Pat. No. 12,007,843.

(51) Int. Cl.
*G06F 11/14*     (2006.01)

(52) U.S. Cl.
CPC ...... *G06F 11/1446* (2013.01); *G06F 11/1471* (2013.01)

(58) Field of Classification Search
CPC .................. G06F 11/1446; G06F 11/1471
See application file for complete search history.

(56) References Cited

U.S. PATENT DOCUMENTS

| | | | |
|---|---|---|---|
| 2004/0078636 A1* | 4/2004 | Suzaki | G06F 21/52 711/113 |
| 2007/0239954 A1 | 10/2007 | Sakashita et al. | |
| 2008/0109831 A1 | 5/2008 | Lee | |
| 2009/0013036 A1 | 1/2009 | Kim et al. | |
| 2013/0151940 A1 | 6/2013 | Bailor et al. | |
| 2017/0032552 A1 | 2/2017 | Gilra | |
| 2018/0364880 A1 | 12/2018 | Rantanen et al. | |

* cited by examiner

*Primary Examiner* — Jae U Yu
(74) *Attorney, Agent, or Firm* — Invoke

(57) ABSTRACT

Techniques for UNDO and REDO operations in a computer-user interface are disclosed. The techniques enables users to configure entities for UNDO and REDO operations. The techniques also enable users to roll back individual entity to an immediate previous state in one UNDO operation and subsequently to the other previous states. Other entities are not affected by the UNDO operations to the entity.

23 Claims, 9 Drawing Sheets

CONFIGURABLE ENTITY-BASED UNDO AND REDO OPERATIONS

INCORPORATION BY REFERENCE; DISCLAIMER

Each of the following applications are hereby incorporated by reference: application Ser. No. 17/903,801, filed Sep. 6, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present invention relates generally to computer-user interfaces and more particularly to undo and redo functions for computer-user interfaces.

BACKGROUND

Computer-user interfaces may include commands allowing users to undo and redo operations. An "UNDO" command enables a user to sequentially rollback operations performed through a sequence of previous states of an application, operating system, or other software having a computer-user interface. A "REDO" command functions in the reverse order as the UNDO command to sequentially restore previously rolled-back operations. For example, if a user desires to undo a number of previous operations performed in an application to correct an earlier error, the user can perform UNDO commands to sequentially roll back the previous operations to return the application to a state before the error. However, doing so can have undesirable side effects. That is, rolling back to the error often involves undoing non-erroneous operations performed subsequent to the error. Accordingly, after undoing the error using multiple UNDO commands, restoring the original state of the application may involve manually repeating the non-erroneous operations. Manually repeating the non-erroneous operations in the computer-user interface inefficiently consumes time, causes errors, and frustrates users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
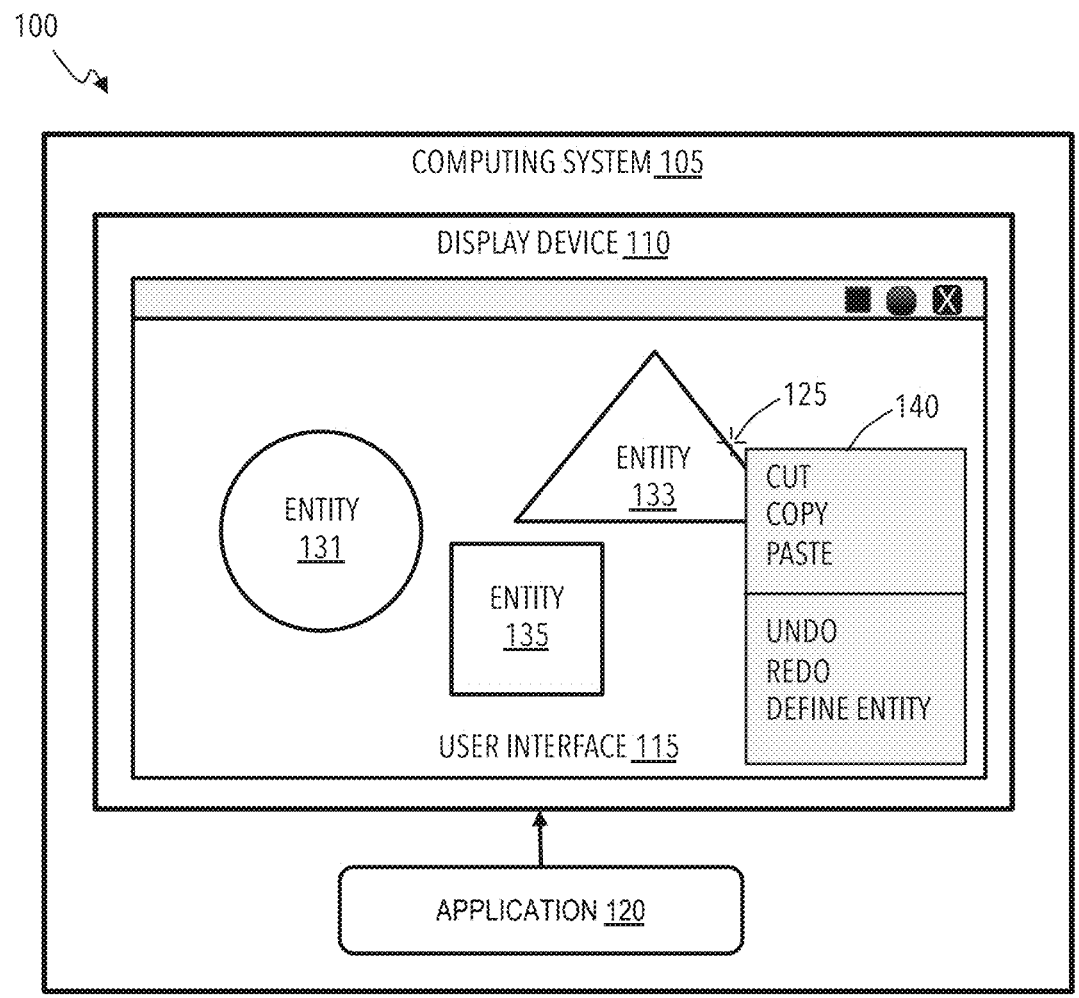
FIG. 1 shows a system block diagram illustrating an example of an environment for implementing systems and processes in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. System Environment
3. System Architecture
4. Undo/Redo Process
5. Hardware Overview
6. Miscellaneous; Extensions

1. General Overview

The present disclosure is directed to systems, methods, and non-transitory computer-readable storage mediums for computer-user interfaces including UNDO and REDO commands. Embodiments identify and track operations executed by a user on individual entities of a computer-user interface to enable entity-specific UNDO and REDO commands. An entity can be an individual component of the computer-user interface whose state can be altered by a user. Entities can comprise a single element or a grouping of elements. For example, some entities can be a single shape (e.g., a rectangle) in a drawing generated by a graphic design application, such as VISIO®, a single word in a document generated a word processing application, such as WORD®; or a single file stored by a file management application, such as SHAREPOINT®, all of which are products of MICROSOFT® Corp. of Redmond, Washington. In another example, an entity can correspond to a database record. Additionally, entities can include multiple components, such as a layer of a drawing application including multiple shapes, a sentence or a paragraph in the word processing application including multiple words, a folder in the file management application including multiple files, or a table of a database application.

Embodiments disclosed herein track operations executed by applications on a per-entity basis to log states of the entities for performing UNDO and REDO operations. One or more embodiments predefine components of an application's computer-user interface as entities. For example, embodiments can use a predefined list of entities. Additionally or alternatively, some embodiments enable users to configure the entities by defining a customized list. Further, some embodiments configure the entities by automatically applying smart criterion or machine learning models that classify components as entities.

In accordance with the present disclosure, a user can command a computer-user interface of an application to UNDO and REDO operations executed on a selected entity. Responsive to the UNDO and REDO commands, the application can identify state information of the selected entity in a corresponding log (e.g., an UNDO stack) and, based on the log, rollback operations executed on selected entity without undoing operations executed on other entities in the computer-user interface. Doing so substantially improves the operation of computer-user interfaces by reducing computing resources used to UNDO and REDO operations on unselected objects and by improving the efficiency and accuracy of the computer-user interface.

2. System Environment

FIG. 1 shows a flow block diagram illustrating an example environment 100 for implementing systems and processes in accordance with aspects of the present disclosure. The environment 100 includes a computing system 105 including a display device 110 displaying a user interface 115 of an application 120. For the sake of example, the application 120 can be a drawing application allowing users to control a cursor 125 to draw and manipulate (e.g., move, rotate, resize, color, etc.) shapes, text, figures, pictures, and other drawing objects, such as entities 131, 133, and 135. The application 120 can identify operations executed on the individual entities 131, 133, and 135 and log the states of the entities 131, 133, and 135 resulting from the operations.

Also, the user interface 115 of the application 120 can include selections for UNDO and REDO commands. In the present example, the application 120 generates an on-demand context menu 140 in the user interface 115 having UNDO and REDO commands selectable by the cursor 125. For example, the user interface 115 can display the context menu 140 in response to a user input (e.g., a right-click mouse operations) on the entity 133. The selection of the UNDO action in the context menu 140 can command the application 120 the rollback the last operation on the selected entity 133. For example, if the most recent operation on entity 133 was resizing the triangle object, the user can UNDO the last operation by triggering the context menu 140 and selecting "UNDO," which causes the application 120 to roll back the most recent operation logged by the application 120 by reverting the entity 133 to a previous state before the resizing. Additionally, selection of the REDO command in the context menu 140 would cause the application 120 to restore the most recent undone operation by restoring entity 133 to an original state prior to the UNDO command.

Further, via the user interface 115, the user can repeatedly command the application 120 to UNDO previous operations executed on entities, such as the entity 133. Responsive to the repeated UNDO commands, the application 120 can sequentially roll back states of the entity 133 based on state information stored in the log for the entity 133 without rolling back any previous operations performed on the entities 131 and 135. For example, the previous operations performed on the entity 133 can be, in reverse order, "resize," "rotate," and "flip." Additionally, the previous operation performed on entity 131 can be, in reverse order, "rotate" and "add." Moreover, the previous operation performed on the entity 131 can be, "add." In reverse-ordered sequence, the operations on all the entities could be, for example, the entity 133: "resize," entity 135: "rotate," entity 135: add," entity 133: "rotate," entity 133: "flip," and the entity 131: "add." Repeatedly using the context menu 140 to command the application to UNDO previous operations performed on the entity 133 would cause the application to sequentially rollback the entity 133 to a state before the "resize" operation, then a state before the "rotate" operation, and then a state before the "flip" operation. However, as the UNDO commands are directed solely to entity 133, the application 120 would not roll back any of the previous operations performed on entities 131 and 135.

3. System Architecture

Figure 2:
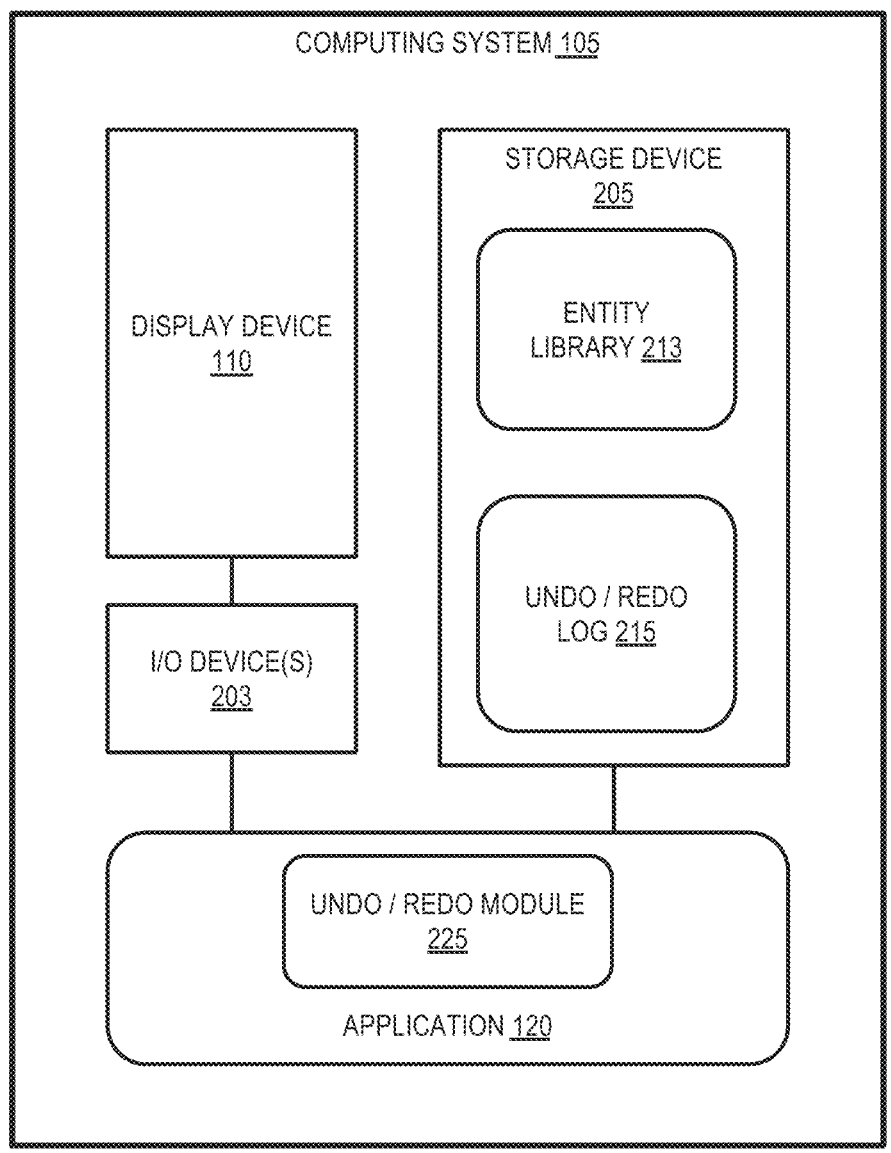
FIG. 2 shows a block diagram illustrating an example system in accordance with one or more embodiments.

FIG. 2 illustrates a computing system 105 in accordance with one or more embodiments. The computing system 105 can be the same or similar to that previously described above. Embodiments of the computing system 105 can be implemented on one or more digital devices. A digital device can be any hardware device that includes a processor. Some embodiments of a digital device may refer to a physical device executing an application or a virtual machine. Examples of digital devices include a personal computer, a tablet, a laptop, a desktop, a server, a web server, a network policy server, a proxy server, a generic machine, a function-specific hardware device, a mainframe, a television, a content receiver, a set-top box, a printer, a mobile handset, a smartphone, a personal digital assistant ("PDA"), and/or a client device.

The computing system 105 can include a display device 110, an input/output device 203, and storage device 205. The display device 110 can be the same or similar to that described above. Embodiments of the display device 110 can be, for example, a liquid crystal display (LCD) display, an organic light emitting diode displays (OLED), or other suitable display devices. The I/O device 203 can include any device that enables an individual to interact with the computing device 430 (e.g., a user interface) and/or any device that enables the computing system 105 to communicate with one or more other computing devices or peripheral devices using any type of communications link. The I/O device 203 can be, for example, a touchscreen display, pointer device (e.g., computer mouse), keyboard, etc.

The storage device 205 can be one or more hard disk drives, flash drives, a compact disk read-only memory (ROM), a digital versatile disk (DVD) optical storage technology, or other suitable fixed, non-transitory computer-readable storage device. The storage device 205 can store computer-readable program instructions, such as applications, software modules, and other program code, and information, such as libraries and data, for operation of the computing system 105. Further, the storage device 205 can store an entity library 213 and an UNDO/REDO log 215. The entity library 213 can store information identifying entities and entity types for tracking and logging for one or my applications (e.g., application 120) executed by the computing system 105. Some embodiments of the entity library 213 identify components or types of components defined as entities. For example, an application can include predefined entities in the entity library 213. Additionally or alternatively, a user can customize the entity library 213. One or more embodiments other embodiments determine entities on the fly using a smart criterion (e.g., a machine learning model) and store the entities in the entity library 213. As detailed below, the UNDO/REDO logs 215 can store time-ordered entity states on a per-entity basis. It is understood that some or all of the information used by the computing system 105 can be stored remotely, such as in the data source 101 or some other data repository or storage system.

Additionally, the computing system 105 can execute computer program instructions for the application 120, which can be the same or similar to that previously described. The application 120 can be any type of software having a computer-user interface, such as a graphic user interface (e.g., user interface 115). For example, the application 120 can be a word processor application, a code editor application, a database application, a spreadsheet application, a presentation application, a drawing application, and mail application, a text messaging application, an internet browser application, a calculator application, a file management application, or any other suitable type of computer software application or module having allowing users to alter components of the user interface.

One or more embodiments of the application 120 can include an UNDO/REDO module 225, which can comprise program instructions for tracking operations (e.g., format, resize, rotate, add, etc.), states, and commands (e.g., UNDO and REDO) performed on entities (e.g., entities 131, 133, 135) generated by the application. The UNDO/REDO module 225 can also instantiate and maintain logs UNDO stacks in the UNDO/REDO logs 215 for each entity tracked. While the UNDO/REDO module 225 is illustrated as being included in the application 120, it is understood UNDO/REDO module 225 can be a standalone module or could be incorporated in another application. For example, the UNDO/REDO module 225 can be a service of an operating system of the computing system 105.

In one or more embodiments, the computing system 105 can include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

According to some embodiments, the techniques described herein are implemented by one or more general-purpose or special-purpose computing devices. A general-purpose computing device can be, for example, a server, a personal computer, a smart phone, a tablet computer, a laptop computer, or the like. A special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Undo Process

Figure 3A:
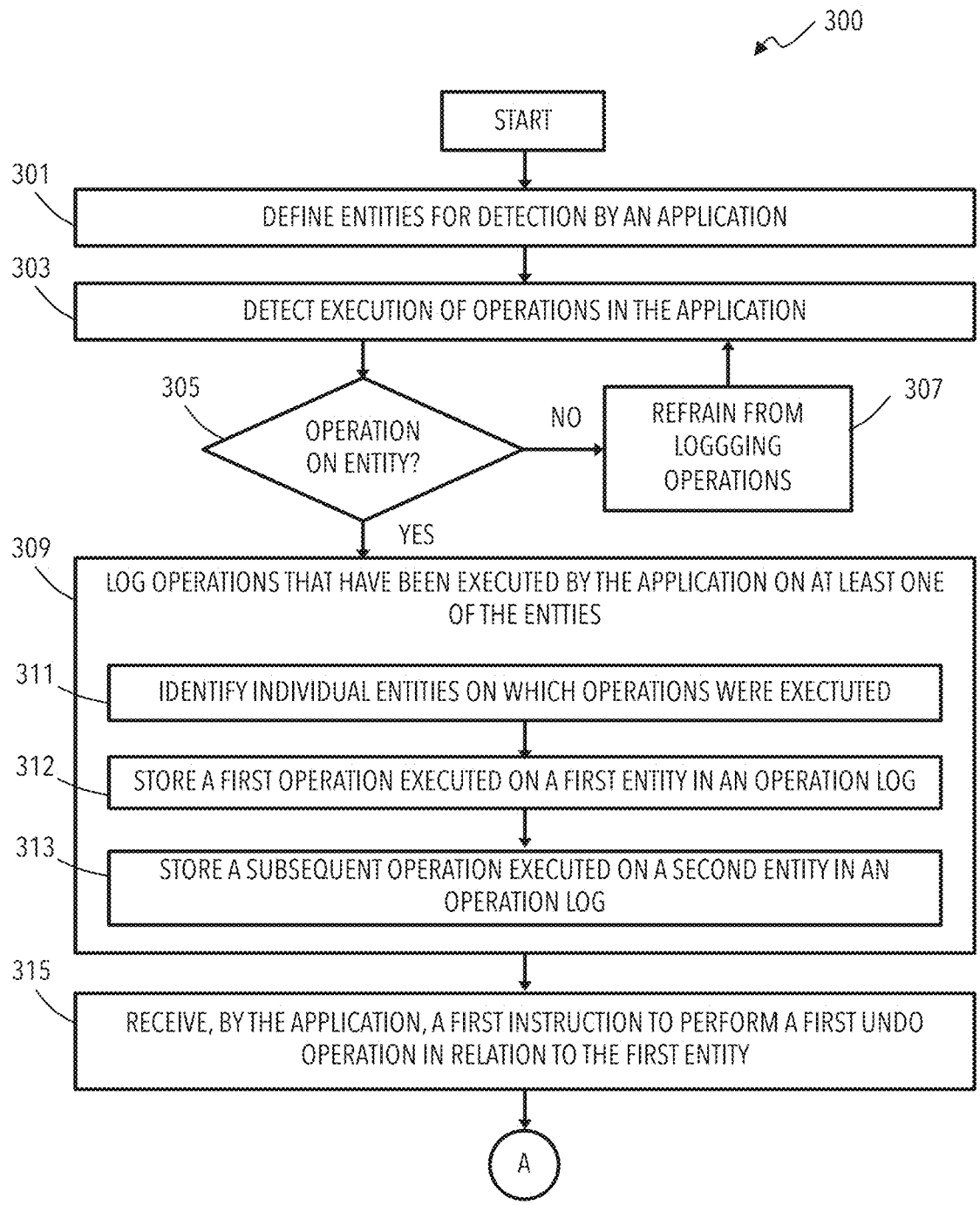
FIGS. 3A and 3B show a process flow block diagram illustrating an example of a process in accordance with one or more embodiments.
Figure 3B:
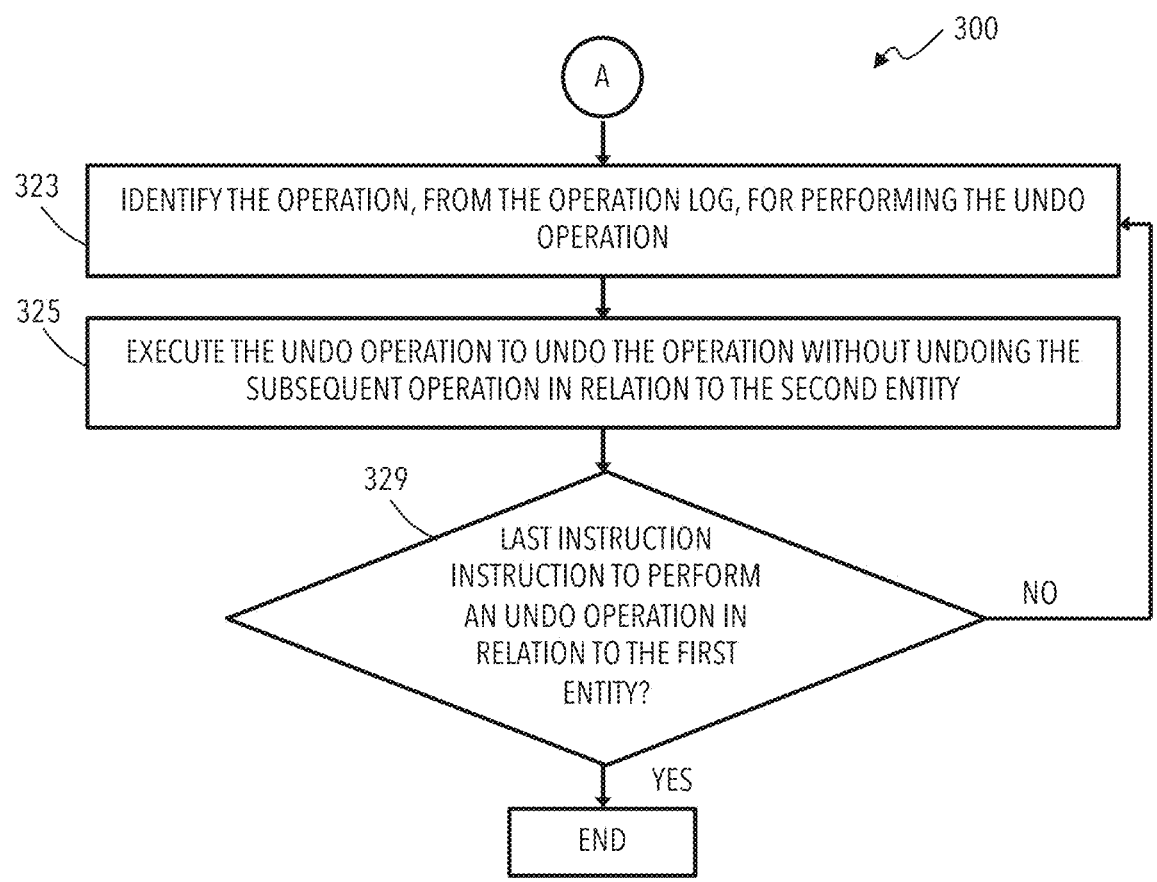

The flow diagrams in FIGS. 3A and 3B illustrate functionality and operations of systems, devices, processes, and computer program products according to various implementations of the present disclosure. Each block in FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIGS. 3A and 3B show a flow block diagram illustrating an example process 300 for performing UNDO operations in accordance with one or more embodiments. At block 301, the process 300 defines entities for detection by an application. As previously described above, entities can be any individual component of a computer-user interface whose state can be altered by a user. Entities (e.g., entities 131, 133, and 135) can comprise a single component of the user interface or a grouping of components (e.g., a drawing layer including entities 131, 133, and 135). The application (e.g., application 120) can be any computer software, module, or set of program instructions that generates a computer-user interface (e.g., user interface 115) allowing users to alter the components of the computer-user interface.

Defining entities for detection can include configuring which computer-user interface components of the application will have operations tracked and states logged. One or more embodiments store predefined components as entities in a library (e.g., entity library 213). Additionally, one or more embodiments enable users to define components as entities. For example, the application can include a user interface menu listing selectable components of the computer-user interface to be defined as entities for tracking and logging (e.g., shapes, groups, layers, and slides of a drawing application). The application can also receive and decode regular expressions or context free grammar to determine rule-based entity definitions based on user inputs. Additionally or alternatively, the computer-user interface can include an on-demand context menu 140 including an option for a user to define a component or group of components as an entity. For example, a user can identify a group of objects in a drawing application as a single entity. Further, one or more embodiments automatically identify components as entities. For example, the application can include a machine learning model trained using data describing previous selections of components and previous UNDO/REDO commands to infer components that should be defined as entities.

At block 303, the process 300 detects execution of operations by a user in the application. For example, the application can monitor user inputs to the user interface via the I/O devices (e.g., I/O devices 203) triggering operations. One or more embodiments detect execution of all operations in the application, including for example, file management operations, menu selections, toolbar commands, information entry, editing operations, and the like. At block 305, the process determines whether the candidate operations detected at block 303 were performed on one or more entities of the computer-user interface. The determination can be based on detecting the execution of an operation at block 303 and determining that the detected operation involved one of the entities configured at block 301. For example, the application can detect a user input resizing an object (e.g., entity 131) in the user interface (e.g., user interface 115) and determine whether the object is defined as an entity (e.g., in entity library 213). If the process determines that the operation was not performed on an entity (e.g., block 305 is "No"), then at block 307, the process 300 refrains from logging the detected operations and returns to block 303.

On the other hand, if the operations detected at block 303 are performed on one or more entities (e.g., block 305 is "Yes"), then at block 309 the process 300 logs the operations detected at block 303 corresponding to the entities identified at block 305 on which operations were executed. Logging the operations can include, at block 311, identifying the individual entities on which the operations were executed. For example, based on coordinates of a cursor (e.g., cursor 125) controlled by an I/O device (e.g., a computer mouse or touch screen), the application can determine that the operation was executed on a particular entity (e.g., entity 131). Logging the operations can also include, at block 312, storing a first operation executed on a first entity in one or more logs (e.g., UNDO/REDO log 215). As detailed below regarding FIG. 6, the logs can include UNDO stacks logging all operations executed by the computer-user interface (e.g., 6, the logs can include UNDO stacks logging all operations executed by the computer-user interface (e.g., UNDO stack 601) and one or more UNDO stacks logging operations executed on particular entities (e.g., UNDO stacks 603, 605, and 607). Logging the operations can also include, at block 313, storing a subsequent operation executed on a second entity in an entity log. One or more embodiments, store the first operation of block 312 and the subsequent operation of block 313 in a same log. The log can include a single stack including the first operation of block 312 and the subsequent operation of block 313, or the log can include different stacks separately storing the first operation of block 312 and the subsequent operation of block 313. Additionally or alternatively, one or more embodiments, store the first operation of block 312 and the subsequent operation of block 313 in different logs. The logging can include storing metadata of the change in state in an UNDO stack for all entities displayed in the user interface. Additionally, for individual entities in the user interface, the logging can include storing state information in UNDO corresponding to the individual entities. It is understood that some embodiments store the state information on the entities in a same log. Other embodiments store the state information on the entities in different logs corresponding to individual entities.

At block 315, the process 300 receives an instruction to perform an UNDO operation by the application in relation to the first entity identified at block 311. Receiving the instruction to perform the UNDO operation can include receiving an input via the user interface executed on the first entity. For example, the computer-user interface of the application can receive a command to perform an UNDO operation on the first entity via a context menu (e.g., on-demand context menu 140) or some other command input (e.g., keyboard shortcuts, such as OPTION-CTRL-Z).

Continuing to FIG. 3B via off-page connector "A," at block 323, based on (a) the instruction to perform the UNDO operation received at block 315 and (b) the operation executed on the first entity stored at block 312 and the subsequent operation executed on the second entity stored at block 313 being executed by the application on different entities, the process 300 identifies an operation, from the operation log, for performing the UNDO operation. Performing the UNDO operation can include searching for the latest-executed operation on the first entity in a set of log entries that include operations executed on the first entity and the second entity in a chronological order. For example, the application can determine that the UNDO operation was directed at the operation stored in an UNDO stack of the first entity at block 312, and not the operation stored in and UNDO stack of the second entity at block 313. At block 325, the process 300 executes the first undo operation to undo the first operation executed on the first entity without undoing the subsequent operation executed on the second entity.

At block 329, the process 300 can determine whether it received instruction to perform another UNDO operation by the application in relation to the first entity identified at block 311. If not (e.g., block 333 is "No,") then the process 300 ends. Is so, (e.g., block 333 is "Yes,") then the process 300 can iteratively repeat blocks 323 and 325 to perform another UNDO operation on the first entity.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
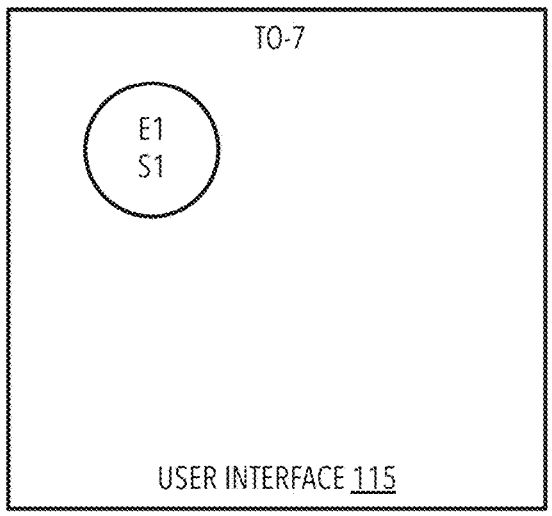
FIGS. 4A, 4B, 4C, 4D, 4E, 4F, 4G, and 4H illustrate changes in entity states in user interface displays in accordance with one or more embodiments.
Figure 4B:
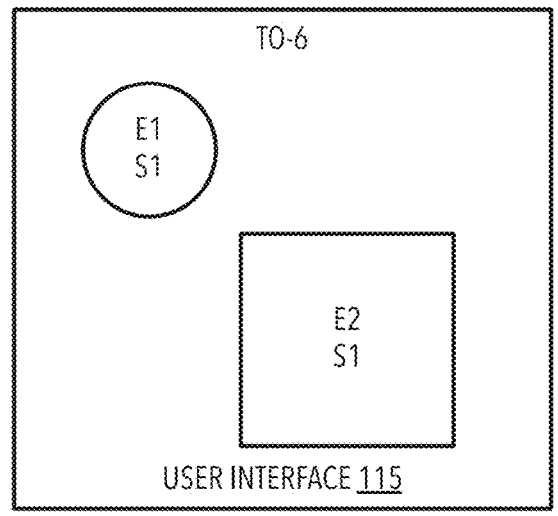
Figure 4C:
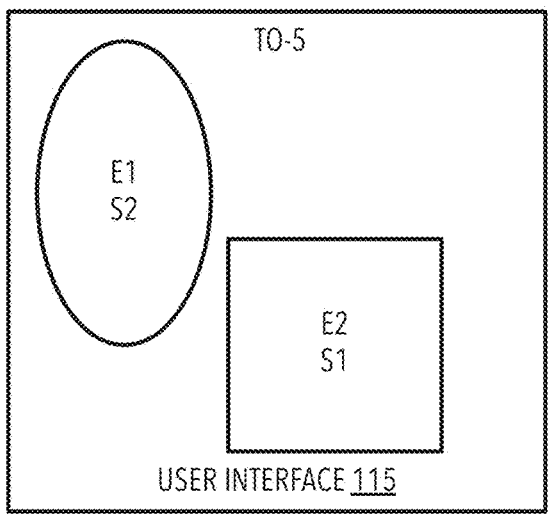
Figure 4D:
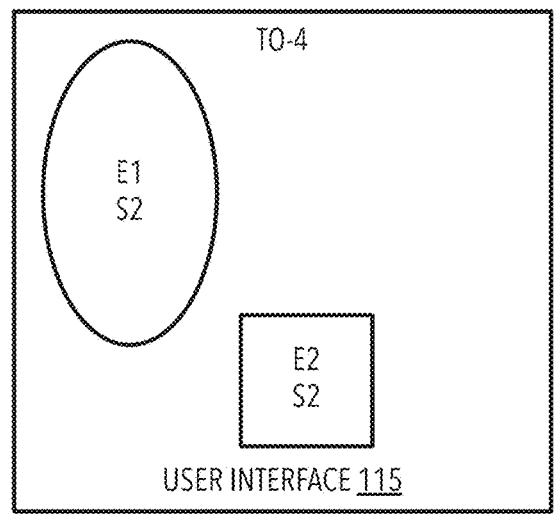
Figure 4E:
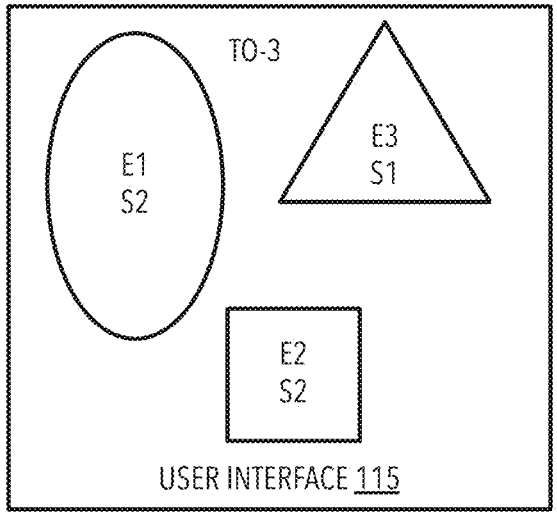
Figure 4F:
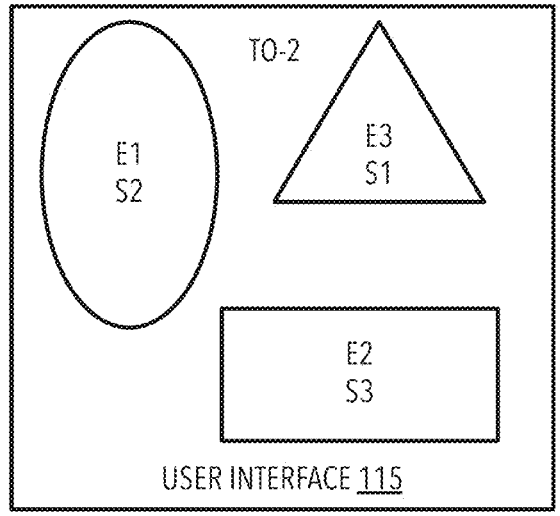
Figure 4G:
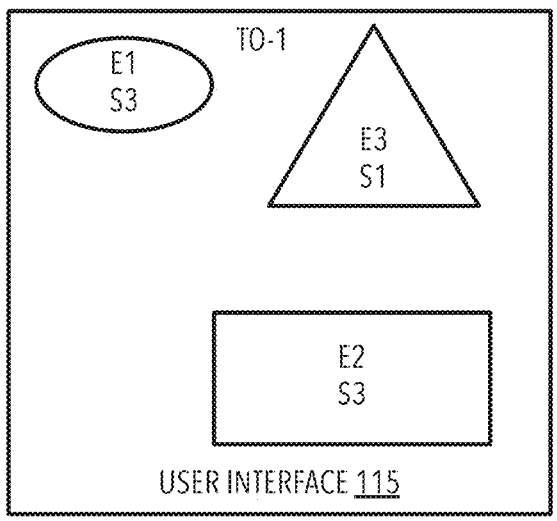
Figure 4H:
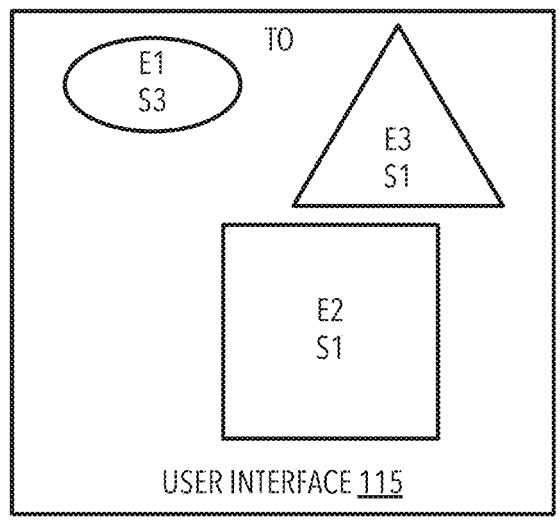

FIGS. 4A, 4B, 4C, and 4D illustrate changes in entity states in application displays screens presented by a user interface 115 by operations an application (e.g., application 120), which can be logged for UNDO/REDO operations, as described herein. The application illustrated can be a drawing application, for example. FIG. 4A shows a first entity E1 (e.g., entity 131) displayed by the user interface 115 in a first state of the entity S1 at a first time (e.g., T0−7) prior to a current time (e.g., T0). The state S1 of entity E1 can be an initial state of entity E1 after the object was originally drawn or state S1 can be some latter state of entity E1 of previous manipulations by a user. FIG. 4B shows the first entity E1 (e.g., entity 131) in the first state of the entity S1 at a second time (e.g., T0−6) prior to the current time. Additionally, FIG. 4B shows a second entity E2 (e.g., entity 135) at the second time. The state S1 of entity E2 can be an initial state of entity E2 after the object was originally drawn or state S1 of entity E2 can be some latter state of entity E2 of previous manipulations by a user. FIG. 4C shows the first entity E1 in the second state of the entity S2, and a second entity E2 (e.g., entity 135) in a first state of the entity S2 at a third time (e.g., T0−5) prior to the current time (e.g., T=0). State S2 of entity E1 can be state of entity E1 after modification of state S1. For example, the state S2 of the entity E1 can be a result of "stretch" operation that changes the proportions of E1. FIG. 4D shows the first entity E1 in the third state of the entity S2, and the second entity E2 in a second state of the entity S2 at a fourth time (e.g., T0=−4) prior to the current time (e.g., T=0). State S2 of entity E2 can be state of entity E2 after modification of state S1. For example, the modification can be a "resize" operation that changes the size of the entity E2 while maintain the relative proportions of the entity E2. FIG. 4E shows the first entity E1 in the third state of the entity S3, the second entity E2 in the first state of the entity S1, and a third entity E3 (e.g., entity 133) in a first state of the entity S1 at a fifth time (e.g., T0−3) prior to the current time (e.g., T=0). State S1 of entity E3 can be an initial state of entity E1 after the object was originally drawn or state S1 can be some latter state of entity E1 of previous manipulations by a user. FIG. 4F shows the first entity E1 in the second state of the entity S2, the second entity E2 in a third state of the entity S3, and the third entity E3 in the first state of the entity S1 at a sixth time (e.g., T0-2) prior to the current time (e.g., T=0). State S3 of entity E2 can be state of entity E2 after modification of state S2. For example, the modification can be a "stretch" operation that changes the relative size and proportions of the entity E2. FIG. 4G shows the first entity E1 in a third the entity S3, the second entity E2 in the third state of the entity S3, and the third entity E3 in the first state of the entity S1 at a seventh time (e.g., T0−1) prior to the current time (e.g., T=0). State S3 of entity E1 can be state of entity E1 after modification of state S2. For example, the modification can be a "stretch" operation that changes the relative size and proportions of E1. FIG. 4H shows the first entity E1 in a fourth state of the entity S4, the second entity E2 rolled back to state S1 of the entity E2 at T−5 as shown in FIG. 4C, and the third entity E3 in the first state S1 of the entity E3 at the current time (e.g., T=0). The rollback of the state of E2 from state S3 to state S1 can be achieved by a UNDO command by the user selecting E2 and executing two UNDO commands. In accordance with aspects of the present disclosure, the UNDO commands only operated on the selected entity E2 and did not a operate on unselected entities E1 and E3. Undoing one or more operations on the entity E2 to roll back the states S3 and S2 did not affect the current state S3 of the entity E1 or the current state S1 of the entity E3.

The example entities shown in FIGS. 4A-4H are illustrated as shapes in a drawing application for the sake of explanation. The entities can be other types of user interface components in other types of applications. For example, the entities can be words, sentences, paragraphs, or sections of a text document. Also, for example, the entities could be terms, code blocks, control blocks, classes, methods, and code files of a code editor application. Further, for example, the entities can be files, folders, or collections of a file management application. Moreover, the entities, can be records, columns, tables, or databases of a database management application. Accordingly, it should be understood that embodiments consistent with the present disclosure encompass other types of application in which a computer-user interface includes entities having states alterable by a user.

Figure 5:
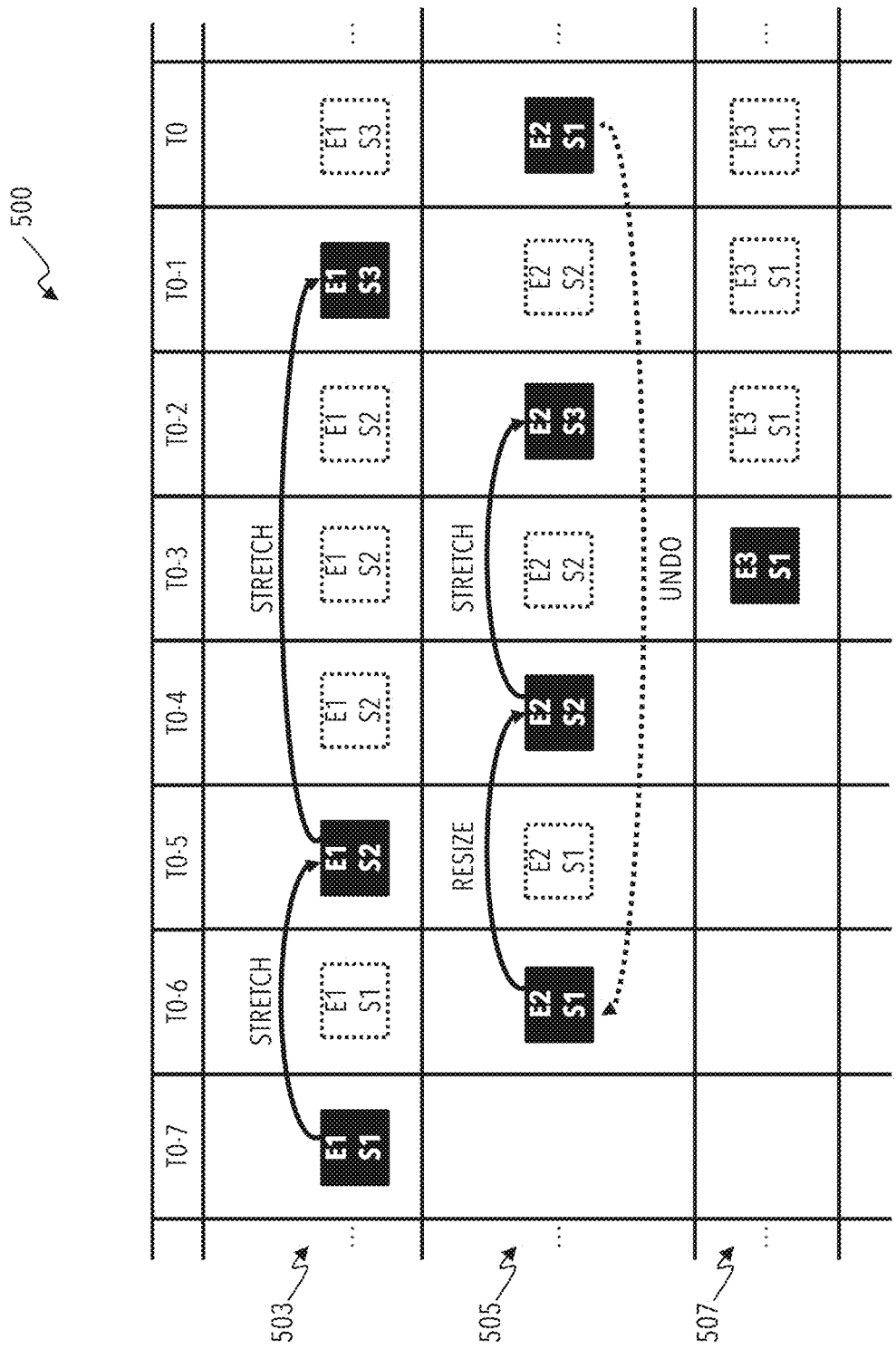
FIG. 5 shows a time flow diagram 500 illustrating the state changes of entities in accordance with one or more embodiments.

FIG. 5 shows a time flow diagram 500 illustrating the state changes of entities presented using the example displays of FIGS. 4A-4H. The time flow diagram 500 includes a number of time slots T0−7, T0−6, T0−5, T0−4, T0−3, T0−3, T0−1, and T0 representing time frames in which operations occurred on entities E1, E2, and E3 in a computer-user interface (e.g., user-interface 115) of an application (e.g., application 120). Additionally, the time flow diagram 500 includes bands 503, 505, and 507 illustrating the states S1, S2, and S3 of the respective entities E1, E2, and E3 during the time slots T0−7, T0−6, T0−5, T0−4, T0−3, T0−3, T0−1, and T0 resulting from operations performed by a user on the entities E1, E2, and E3 via the computer-user interface.

As illustrated above regarding FIGS. 4A-4H, band 503 show the states of the entity E1. At T0−7, the entity E1 is in a state S1. (See, e.g., FIG. 4A.) At T0−5, the entity E1 is in a state S2 as a result of the user performing a "stretch" operation. (See, e.g., FIG. 4C.) At T0−1, the entity E1 is in a state S3 resulting from the user performing a second "stretch" operation. (See, e.g., FIG. 4G.). Band 505 shows the states of entity E2. At T0−6, the entity E2 is in a state S1. (See, e.g., FIG. 4B.) At T0−4, the entity E2 is in a state S2 resulting from the user performing a "resize" operation. (See, e.g., FIG. 4D.) At T0−2, the entity E2 is in a state S3 resulting from the user performing a "stretch" operation. (See, e.g., FIG. 4F.) At T0, the entity E2 is in a state S1 resulting from the user performing selecting the entity E2 and instructing the computer user-interface to perform two sequential UNDO commands to roll back the entity E2 from state S3 to S2, and from state S2 to state S1. (Sec, e.g., FIG. 4H.) Band 507 shows the states of entity E2. At T0−6, the entity E3 is in a state S1. In accordance with aspects of the present disclosure, at the current time, T0, the current state S1 of the entity E2 has been rolled back from state S3 at T0−2 and from state S2 at T0−4 as the result of UNDO commands executed on the entity E2 at T0. Whereas the UNDO commands did not change the state of the entities E1 and E3. As the user did not select entities E1 and E3 for execution of UNDO commands at T0, the entity E1 retains state S3 from T0−1 and the entity E3 retains the state S1 from T0−3.

One or more embodiments log the operations on the entities E1, E2, and E3 in UNDO stacks, as described below regarding FIG. 6. For example, the application can receive a "stretch" command via the computer-user interface causing the application to execute a first "stretch" operation on the entity E2 at T0−2 prior to the logging the stretch operation. Also, the application can receive another "stretch" command via the computer-user interface causing the application to execute a second "stretch" operation on the entity E1 at T0−1 prior to the logging the second stretch operation. Notably, the first "stretch" command and the second "stretch" command can command correspond to a same command of the application with different parameter values corresponding respectively to the entities E1 and E2.

Figure 6:
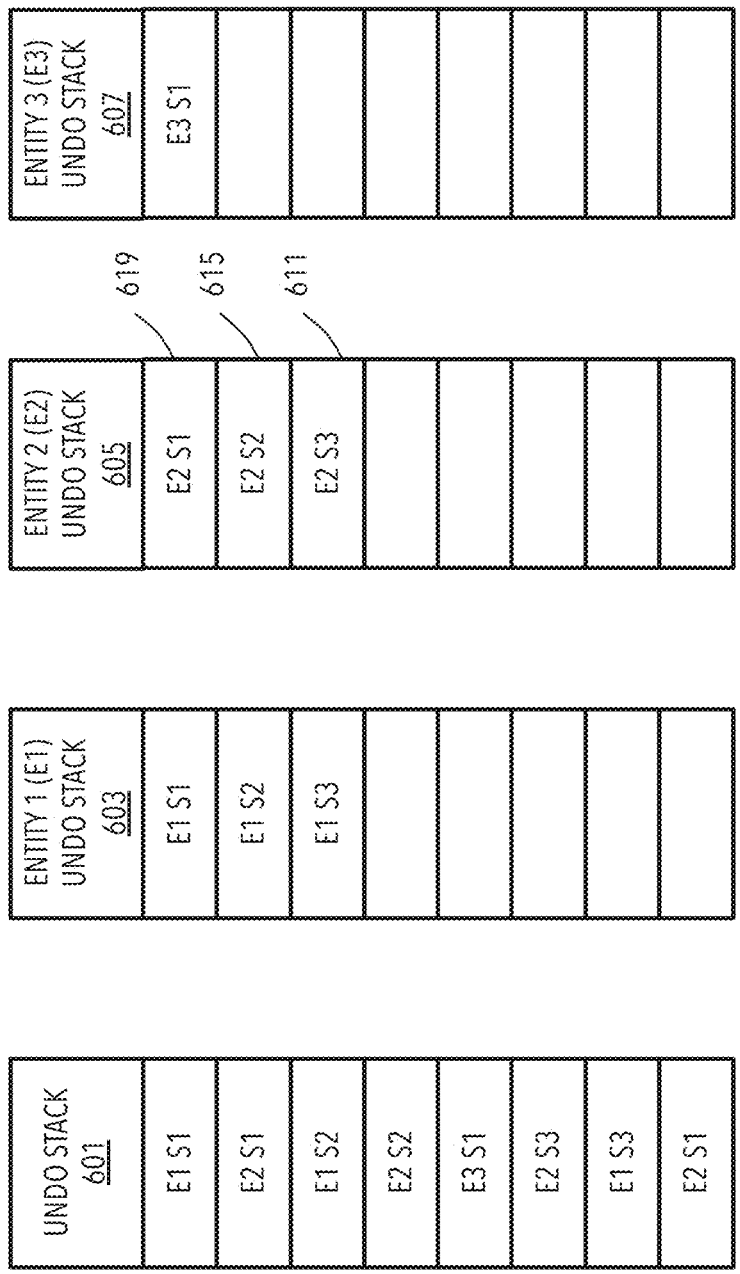
FIG. 6 shows example stacks recording the states of entities in accordance with one or more embodiments.

FIG. 6 shows example UNDO stacks 601, 603, 605, and 607 maintained by an application in a log (e.g., UNDO/REDO log 215) that record the state information (e.g., S1, S2, S3) of entities (e.g., E1, E2, E3) in the example display screens of FIGS. 4A-4H. The UNDO stacks 601, 603, 605, and 607 can be data structures that store the state information in time-ordered blocks with the most recent information stored at the bottommost occupied block and the oldest information stored at the topmost block. While the stacks 601, 603, 605, and 607 illustrated in FIG. 6 as including eight blocks, such as blocks 611, 615, and 619, for the sake of explanation, it is understood that any number of blocks can be used. For example, each UNDO stack 601, 603, 605, and 607 could include 64 or more blocks. It is also understood that the order of the blocks can be reversed such that the most recent information is stored at the topmost block and the oldest information is stored at the bottommost occupied block.

The state information stored in the UNDO stacks 601, 603, 605, and 607 can include a current state of an entity and an operation of a user-interface (e.g., user interface 115) that resulted in the current state. Additionally, the state information can include parameters for displaying the respective entity E1, E2, E3 by the application in the preceding state and/or the current state. The parameters for displaying the entities E1, E2, E3 can include data used by the application to draw or redraw the entity E1, E2, E3 in the user interface. For example, for an object of a drawing application, the parameters can include identification, size, position, text, shadow, reflection, three-dimensional format, rotation, fill, line parameters, and the like. The information describing the entity can also include values describing a change in parameters from the previous state to the current state. For example, the change in parameters for a resize operation can include a change in vertical size and a change in horizontal size of the entity.

UNDO stack 601 can be a data structure used by the application (e.g., application 120 executing UNDO/REDO module 225) to log state information of all entities in a computer-user interface of the application). Referring to the example shown in FIG. 5, the UNDO stack 601 can log states S1, S2, and S3 of entities E1, E2, and E3 in bands 503, 505, and 505 on time-wise basis. For example, in the time-order illustrated in FIG. 5, the UNDO stack 601 can log state 1 of E1, state 1 of E2, state 2 of E2, state 1 of E3, state 3 of E2, state 3 of E1.

Additionally, in accordance with aspects of the present disclosure, the entity UNDO stacks 603, 605, 607 can be data structures used by the application to store state information of individual entities E1, E2, and E3, respectively. Referring to the example shown in FIG. 5, the entity UNDO stack 603 can log state information of the entity E1 in band 503, the entity UNDO stack 603 can log state information of the entity E2 in band 505, and entity UNDO stack 607 can log state information of the entity E3 in band 507. Using the entity UNDO stacks 603, 605, and 607, the application can selectively perform UNDO operations on of individual entities E1, E2, and E3. For example, as illustrated in FIGS. 4H and 5, in response to selecting entity E2 via the user interface 115, the application can roll back the state of the entity E2 based on stack 605 from state S3 in block 611 to state S1 in block 619 independently of the state information stored in UNDO stacks 601, 603, and 607. Rolling back the state of entity E2 from state S3 to state S1 in response to an UNDO operation executed on the entity E2 in the user interface can involve, identifying the current state of E2 block 611 of stack 603 (e.g., E2, S3), and reverting the entity E2 to state S2 based on the state information stored in block 615, and further revert the entity E2 to state S1 based on the state information store in block the entity E2, state S2.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
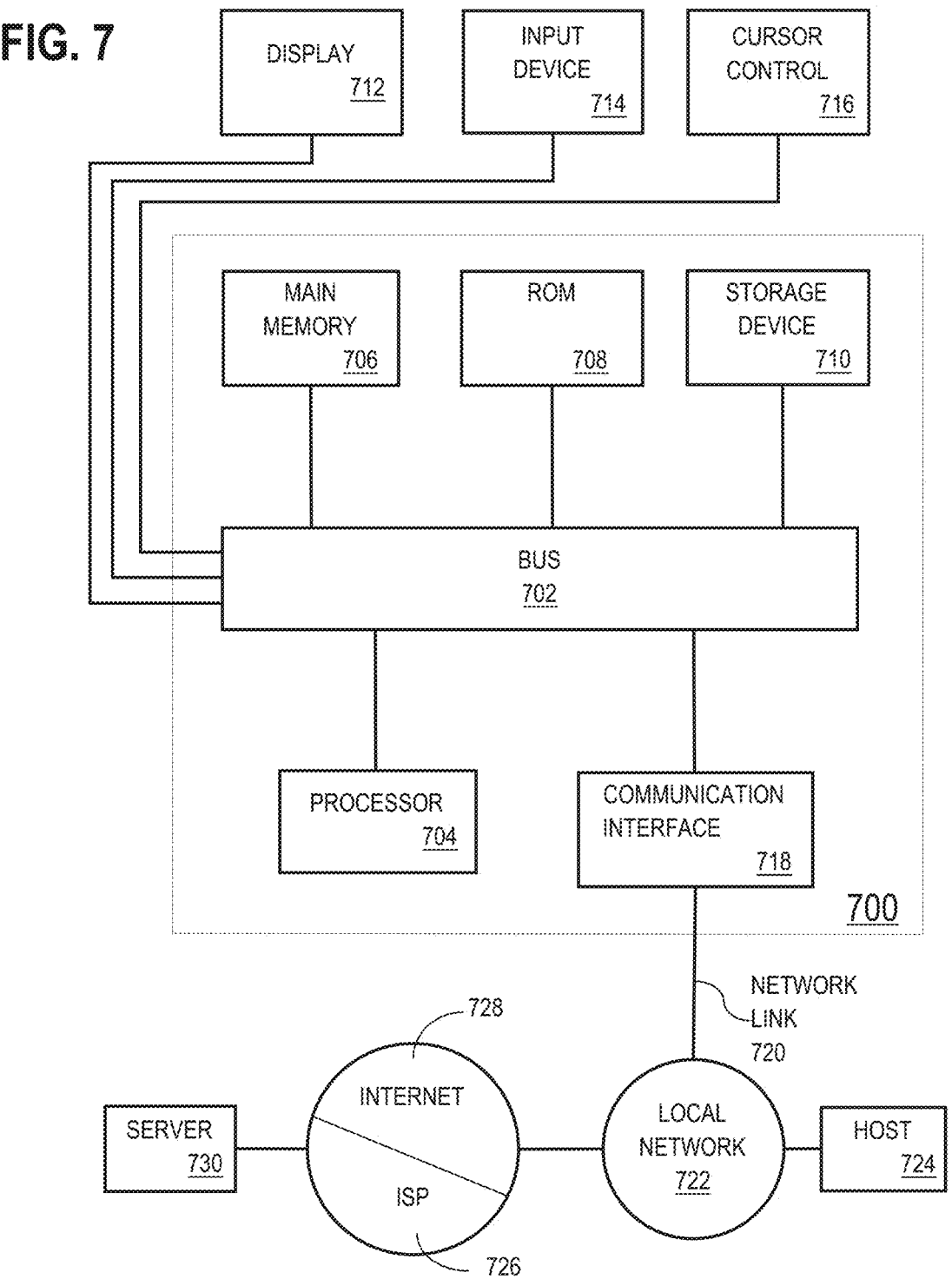
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable storage medium comprising instructions which, when executed by one or more hardware processors, causes performance of operations comprising:
    logging, by an application, a plurality of operations that have been executed by the application, the plurality of operations being executed on at least one of a plurality of entities, the plurality of operations comprising:
        a first operation executed, by the application, on a first entity of a plurality of entities; and
        a second operation executed, by the application, on a second entity of the plurality of entities;
        a first undo operation executed, by the application, to undo the first operation executed on the first entity;
        a second undo operation executed, by the application, to undo the second operation executed on the second entity, wherein the second undo operation is executed subsequent to the first undo operation;
    receiving, by the application, a first instruction that (a) specifies the first entity and (b) includes a command to perform a first redo operation in relation to the first entity; and
    based on (a) the first instruction specifying the first entity and (b) including the command to perform the first redo operation in relation to the first entity:
        identifying the first operation, stored in an operation log in association with the first entity, for performing the first operation; and
        executing the first redo operation to redo the first operation without redoing the second operation that was undone via the second undo operation by the application subsequent to the first operation being undone via the first undo operation by the application.

2. The medium of claim 1, wherein the first operation and the second operation are logged by the application in the same operation log.

3. The medium of claim 1, wherein the first operation and the second operation are logged by the application in different stacks of the same operation log.

4. The medium of claim 1, wherein executing the first redo operation comprises:
   searching for a latest-executed undo operation on the first entity to identify the first undo operation;
   determining that the first undo operation was executed to undo the first operation on the first entity; and
   selecting the first operation as a target of the first redo operation.

5. The medium of claim 1, wherein:
   prior to the logging the first operation, receiving by the application, via a first interface, a first command to execute the first operation, wherein the application executes the first operation in response to the first command; and
   prior to logging the second operation, receiving by the application via the same first interface, a second command to execute the second operation, wherein the application executes the second operation in response to the second command.

6. The medium of claim 5, wherein the first command and the second command correspond to a same command with different parameter values corresponding respectively to the first entity and the second entity.

7. The medium of claim 1, wherein:
   the first instruction specifies the first operation to be redone; and
   the operations further comprise, based on (a) the first instruction and based on (b) the first operation and the second operation being executed by the application on different entities:
      identifying a third operation, from the operation log, executed on the first entity that was undone by the first undo operation on the first entity; and
      executing a second redo operation to redo the third operation.

8. The medium of claim 1, wherein the application maintains a plurality of operation logs respectively associated with the plurality of entities, and wherein maintaining the plurality of operations comprises:
   responsive to detecting execution of each particular operation of the plurality of operations:
      identifying a particular entity of the plurality of entities on which the particular operation has been executed; and
      storing the particular operation in an operation log, of the plurality of operations logs, corresponding to the particular entity.

9. The medium of claim 1, wherein the application maintains a single operation log to store operations executed on any of the plurality of entities, wherein maintaining the plurality of operations comprises:
   responsive to detecting execution of each particular operation of the plurality of operations:
      identifying a particular entity of the plurality of entities on which the particular operation has been executed; and
      storing the particular operation, in the single operation log, with an identification of the particular entity on which the particular operation was executed.

10. The medium of claim 1, wherein the operations further comprise:
   determining, by the application, that a candidate operation executed by the application, wherein the candidate operation is not executed on any of the plurality of entities; and
   responsive to determining that the candidate operation has not been executed on any of the plurality of entities, refraining from logging the candidate operation in a same manner as the plurality of operations.

11. The medium of claim 1, wherein a first entity and a second entity of the plurality of entities correspond respectively to a first portion and a second portion of a content item.

12. A method comprising:
   logging, by an application, a plurality of operations that have been executed by the application, the plurality of operations being executed on at least one of a plurality of entities, the plurality of operations comprising:
      a first operation executed, by the application, on a first entity of a plurality of entities; and
      a second operation executed, by the application, on a second entity of the plurality of entities;
      a first undo operation executed, by the application, to undo the first operation executed on the first entity;
      a second undo operation executed, by the application, to undo the second operation executed on the second entity, wherein the second undo operation is executed subsequent to the first undo operation;
   receiving, by the application, a first instruction that (a) specifies the first entity and (b) includes a command to perform a first redo operation in relation to the first entity; and
   based on (a) the first instruction specifying the first entity and (b) including the command to perform the first redo operation in relation to the first entity:
      identifying the first operation, stored in an operation log in association with the first entity, for performing the first operation; and
      executing the first redo operation to redo the first operation without redoing the second operation that was undone via the second undo operation by the application subsequent to the first operation being undone via the first undo operation by the application.

13. The method of claim 12, wherein the first operation and the second operation are logged by the application in the same operation log.

14. The method of claim 12, wherein the first operation and the second operation are logged by the application in different stacks of the same operation log.

15. The method of claim 12, wherein executing the first redo operation comprises:
   searching for a latest-executed undo operation on the first entity to identify the first undo operation;
   determining that the first undo operation was executed to undo the first operation on the first entity; and
   selecting the first operation as a target of the first redo operation.

16. The method of claim 12, wherein:
   prior to the logging the first operation, receiving by the application, via a first interface, a first command to execute the first operation, wherein the application executes the first operation in response to the first command; and
   prior to logging the second operation, receiving by the application via the same first interface, a second command to execute the second operation, wherein the application executes the second operation in response to the second command.

17. The method of claim 16, wherein the first command and the second command correspond to a same command with different parameter values corresponding respectively to the first entity and the second entity.

18. The method of claim 12, wherein:
the first instruction specifies the first operation to be redone; and
the operations further comprise, based on (a) the first instruction and based on (b) the first operation and the second operation being executed by the application on different entities:
identifying a third operation, from the operation log, executed on the first entity that was undone by the first undo operation on the first entity; and
executing a second redo operation to redo the third operation.

19. The method of claim 12, wherein the application maintains a plurality of operation logs respectively associated with the plurality of entities, and wherein maintaining the plurality of operations comprises:
responsive to detecting execution of each particular operation of the plurality of operations:
identifying a particular entity of the plurality of entities on which the particular operation has been executed; and
storing the particular operation in an operation log, of the plurality of operations logs, corresponding to the particular entity.

20. The method of claim 12, wherein the application maintains a single operation log to store operations executed on any of the plurality of entities, wherein maintaining the plurality of operations comprises:
responsive to detecting execution of each particular operation of the plurality of operations:
identifying a particular entity of the plurality of entities on which the particular operation has been executed; and
storing the particular operation, in the single operation log, with an identification of the particular entity on which the particular operation was executed.

21. The method of claim 12, wherein the operations further comprise:
determining, by the application, that a candidate operation executed by the application, wherein the candidate operation is not executed on any of the plurality of entities; and
responsive to determining that the candidate operation has not been executed on any of the plurality of entities, refraining from logging the candidate operation in a same manner as the plurality of operations.

22. The method of claim 12, wherein a first entity and a second entity of the plurality of entities correspond respectively to a first portion and a second portion of a content item.

23. A system comprising
a hardware processor;
a non-transitory computer readable storage medium comprising program instructions which, when executed by the hardware processors, causes performance of operations comprising:
logging, by an application, a plurality of operations that have been executed by the application, the plurality of operations being executed on at least one of a plurality of entities, the plurality of operations comprising:
a first operation executed, by the application, on a first entity of a plurality of entities; and
a second operation executed, by the application, on a second entity of the plurality of entities;
a first undo operation executed, by the application, to undo the first operation executed on the first entity;
a second undo operation executed, by the application, to undo the second operation executed on the second entity, wherein the second undo operation is executed subsequent to the first undo operation;
receiving, by the application, a first instruction that (a) specifies the first entity and (b) includes a command to perform a first redo operation in relation to the first entity; and
based on (a) the first instruction specifying the first entity and (b) including the command to perform the first redo operation in relation to the first entity:
identifying the first operation, stored in a operation log in association with the first entity, for performing the first operation; and
executing the first redo operation to redo the first operation without redoing the second operation that was undone via the second undo operation by the application subsequent to the first operation being undone via the first undo operation by the application.

* * * * *

UNITED STATES PATENT AND TRADEMARK OFFICE
CERTIFICATE OF CORRECTION

PATENT NO. : 12,259,788 B2
APPLICATION NO. : 18/653558
DATED : March 25, 2025
INVENTOR(S) : Oruganti et al.

Page 1 of 1

It is certified that error appears in the above-identified patent and that said Letters Patent is hereby corrected as shown below:

In the Drawings

On sheet 3 of 9, in FIG. 3A, under reference numeral 307, Line 2, delete "LOGGGING" and insert -- LOGGING --, therefor.

On sheet 3 of 9, in FIG. 3A, under reference numeral 311, Line 1, delete "EXECTUTED" and insert -- EXECUTED --, therefor.

In the Specification

In Column 9, Line 29, delete "T-5" and insert -- T0-5 --, therefor.

In Column 10, Line 20, delete "(Sec," and insert -- (See, --, therefor.

Signed and Sealed this
Seventeenth Day of June, 2025

Coke Morgan Stewart
*Acting Director of the United States Patent and Trademark Office*